(No Model.)
W. R. BOLING.
WAGON GEAR.
No. 287,797. Patented Nov. 6, 1883.
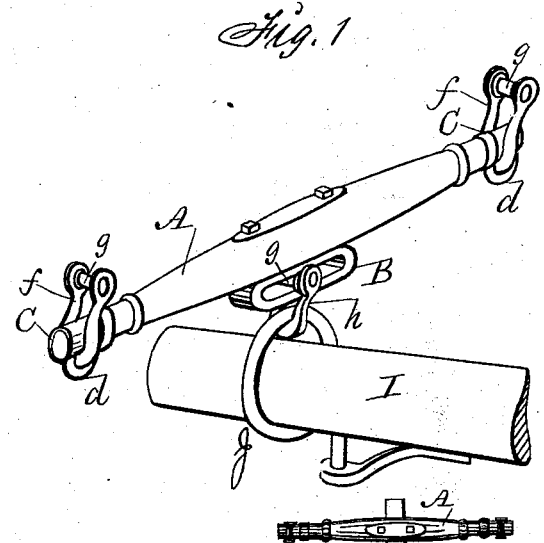
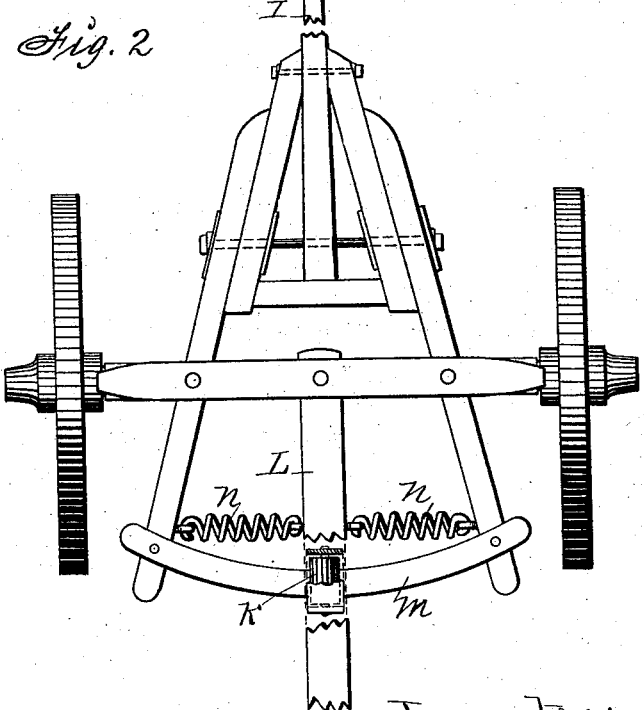
Witnesses:
E. S. Wishard
H. A. Stoltenberg
Inventor:
William R. Boling
By Thomas G. Orwig, Atty.

UNITED STATES PATENT OFFICE.

WILLIAM R. BOLING, OF OCHEYDAN, IOWA.

WAGON-GEAR.

SPECIFICATION forming part of Letters Patent No. 287,797, dated November 6, 1883.

Application filed March 12, 1883. (No model.)

*To all whom it may concern:*

Be it known that I, WILLIAM R. BOLING, of Ocheydan, in the county of Osceola and State of Iowa, have invented an Improved Pole-Yoke and Wagon-Gear, of which the following is a specification.

The object of my invention is to prevent the friction and wear on pole-straps and harness and to relieve the horses' breasts from the beating and concussion incident to the jarring of the wagon and lashing of the tongue when a wheel strikes an obstruction, drops in a rut, or passes over a rough road.

It consists, first, in combining a loop and ferrules having eyes with a yoke, to connect clevises having anti-friction rollers therewith, in such a manner that the yoke will have lateral play relative to the horses and the carriage or wagon tongue to which it is attached; second, in combining an anti-friction roller and two springs with the reach and front gear of a wagon in such a manner that they will act in concert with my self-adjusting yoke, to prevent the tongue from lashing and striking the horses, all as hereinafter fully set forth.

Figure 1 of my accompanying drawings is a perspective view of my improved yoke applied to a wagon-tongue. Fig. 2 is a top view of the front gear of a wagon, showing the anti-friction roller and springs combined therewith. Together these figures clearly illustrate the construction, application, and operation of my complete invention.

A represents a wooden pole-yoke of common form.

B is an elongated loop and roller-bearing, fixed to the under side and center of the yoke by means of screw-bolts or rivets.

C C are metal ferrules on the ends of the yoke A. Each ferrule has an eye, *d*, formed integral therewith or fixed thereto to extend at right angles therefrom, to form bearings for the clevises *f*, linked thereto in such a manner that the clevises will bear upward against the ferrules and end of the yoke when in use, and also allow the yoke to sway or swing laterally relative to the tongue and horses. Each clevis has a metal roller, *g*, secured in its end by means of a screw-bolt or rivet, to relieve the straps or irons that extend through the clevises *f*, and are fastened to the horse-collars, from friction and wear.

*h* is a clevis, having a roller, *g*, in its end, combined with the loop and bearing B in such a manner that the yoke will be allowed to move laterally relative to the tongue and horses. The clevis *h* is flexibly and detachably connected with the front end of the tongue I by means of a ring, as clearly shown in Fig. 1.

*k* is an anti-friction roller attached to the reach L in such a position relative to the cross-piece *m*, that connects the rear ends of the hounds, that it will engage that cross-piece and relieve it from friction on the reach, and thereby facilitate the lateral movements of the front of the wagon relative to the reach and the rear wagon, and also prevent jarring and concussion when the wheels strike obstructions.

*n n* are springs fixed to the hounds or to the cross-piece *m*, on opposite sides of the reach L, in such a manner that in their normal condition they will retain the reach in the center of the cross-piece and aid in preventing the wagon from jarring and the tongue from lashing when a wheel strikes an obstruction, drops into a rut, or passes over a rough road.

I am aware that loops and rings heretofore attached to neck-yokes have been provided with spools or anti-friction rollers to prevent the wearing of straps. I am also aware that anti-friction rollers and springs have been combined with the running-gear of a wagon to steady the movements of the wagon and to prevent concussion; but my manner of combining a clevis having an anti-friction roller with the central portion of a neck-yoke by means of an elongated loop or bearing, and combining an anti-friction roller and spring with the running-gear of a wagon, so that they will coact in preventing the tongue or wagon-pole from lashing and chafing the horses' shoulders, is novel and greatly advantageous, because the movement of the front end of the tongue is restricted in motion and force by means of the springs and roller at its rear end, and the neck-yoke is allowed independent lateral movement relative to the tongue by means of the elongated bearing and the clevis having a roller applied to its center. The springs and anti-friction roller restrict the lashing of the tongue, but do not entirely prevent it, and without provision for the lateral movement of the front end of the tongue relative to the neck-yoke it would, nevertheless, jerk the neck-yoke relative to the horses. By my combination of a neck-yoke provided with an elongated loop to allow lateral play relative to the tongue and gearing provided with springs and an anti-friction roller, I more effectually prevent the lateral jerking of the neck-yoke, and the consequent friction and wear on the pole-straps and harness and the chafing of horses' shoulders incident to such lateral pushing and jerking of a neck-yoke on the end of a wagon-tongue.

I claim as my invention—

1. The yoke A, having a loop, B, in its center and ferrules C at its ends, that are provided with eyes $d$, the clevises $f$, having metal rollers $g$, the clevis $h$, having a roller, $g$, and a ring, J, arranged and combined substantially as shown and described, and adapted to be connected with a wagon-tongue, to operate in the manner set forth, for the purposes specified.

2. The wagon-reach L, having an anti-friction roller, $k$, the cross-piece $m$, having springs $n$ $n$, the wagon-tongue I, and the yoke A, having a loop, B, the clevis $h$, having a roller, $g$, and the ring J, arranged and combined substantially as shown and described, for the purposes specified.

WILLIAM RILEY BOLING.

Witnesses:
A. V. RANDALL,
J. TOWNSEND.